March 26, 1968 J. D. NEWMAN ET AL 3,375,448

VARIABLE DIVIDERS

Filed Aug. 30, 1965 5 Sheets-Sheet 1

March 26, 1968 J. D. NEWMAN ET AL 3,375,448

VARIABLE DIVIDERS

Filed Aug. 30, 1965

5 Sheets-Sheet 2

March 26, 1968 J. D. NEWMAN ETAL 3,375,448

VARIABLE DIVIDERS

Filed Aug. 30, 1965 5 Sheets-Sheet 3

United States Patent Office 3,375,448

Patented Mar. 26, 1968

3,375,448

VARIABLE DIVIDERS

John David Newman, Hayling Island, and Robert A. Elliot, Petersfield, England, assignors to The Plessey Company Limited, Ilford, England a British company Filed Aug. 30, 1965, Ser. No. 483,457
Claims priority, application Great Britain, Sept. 4, 1964, 36,432/64
7 Claims. (Cl. 328—42)

ABSTRACT OF THE DISCLOSURE

A variable divider apparatus having counter means settable to a desired division ratio into which is applied input signal pulses, bistable means operable when said counter means attains its recognition state, gating means responsive to said bistable means and effective for causing said counter means to be reset by the rerouting of said input signal pulses, and side-step means effective for causing the overall division ratio of said variable divider to be changed from the division ratio set into said counter means.

The invention relates to variable dividers for use in electrical oscillation generators.

Where electrical oscillation generators, incorporating variable dividers are used in radio transmit/receive equipment it is desirable, for any frequency being used, to be able to vary the frequency being generated by the intermediate frequency. When the equipment is being utilised as a receiver the frequency of the oscillation generator is required to be the received aerial frequency plus the intermediate frequency. When the equipment is being utilised as a transmitter the oscillation generator is required to produce a frequency output which has a value equal to the above-mentioned aerial frequency. For convenience, it is desirable that the variable divider be set to the received frequency in the case of a receiver and the transmitted frequency in the case of a transmitter, but in each of these cases, the output from the electrical oscillation generator (normally given by the variable divider setting) is required to be a frequency which is different from the variable divider setting, and which, in fact, is spaced from the variable divider setting, by a frequency equal to the intermediate frequency. In the variable divider of the present invention, it is necessary to provide means in addition to the normal switching means by which the variable divider may be set, so that the aforementioned difference frequency can be accounted for.

According to one aspect of the invention we provide an electrical oscillation generator including a standard frequency source and a slave oscillator of frequency variable over a required range under control of a variable frequency divider whose ratio is settable to any one of a number of values, the variable divider including at least one counter arranged so as to be capable of changing the division ratio of the variable divider by a predetermined amount from that set into the variable divider.

The arrangement may be such that a predetermined number or numbers of input pulses to the counter can be inhibited, whereby a division operation is performed in which the frequency of the slave oscillator is divided by a greater number than that set.

The arrangement may be such that a predetermined number or numbers of pulses can be added to the input pulses to the counter, whereby a division operation is performed in which the frequency of the slave oscillator is divided by a lower number than that set.

The counter may be a resettable counter and the arrangement may be such that the counter is reset to a number different from that corresponding to the division ratio that is set into the variable divider, provision being made to inhibit or produce extra carry pulses to succeeding counter stages as necessary.

The arrangement may be such that the recognition state in the counter can be changed or delayed whereby the division ratio that is set into the variable divider can be increased. This arrangement may be achieved by including further counters in the recognition or reset lines to the said counter.

The foregoing and other features of the invention will be evident from the following description of a variable-frequency oscillation generator embodying the invention in its preferred form. The description refers to the accompanying drawings, in which.

Figure 1:
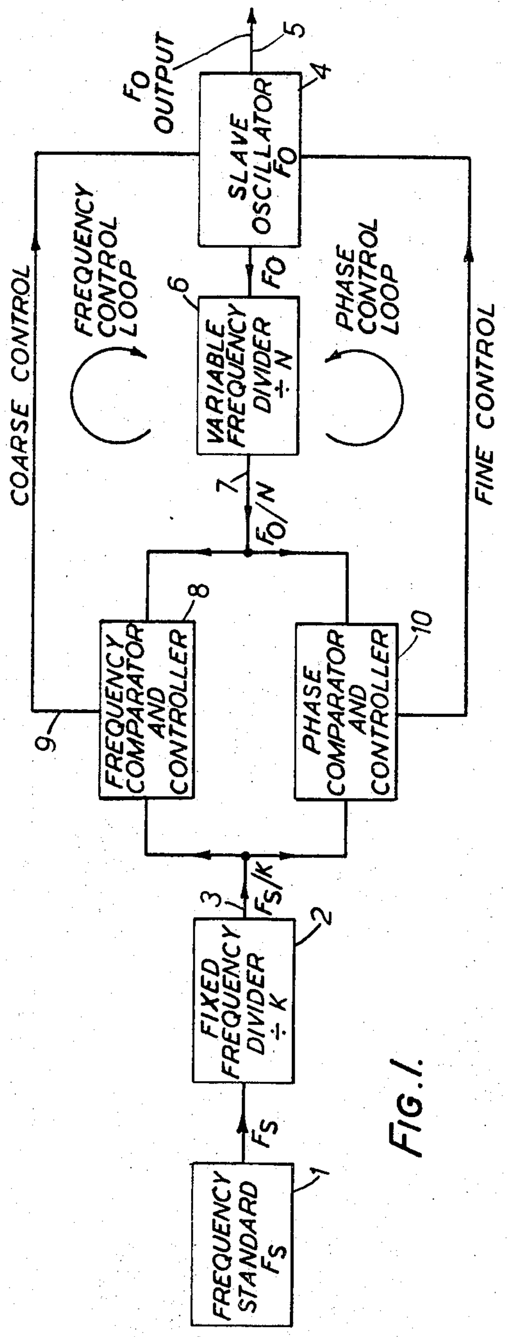
FIGURE 1 is a general block diagram of the apparatus.

The circuit elements shown in block form in the drawings are all examples of devices in widespread current use, so that detailed description of their circuit arrangements is unnecessary.

The apparatus shown in the drawings forms an oscillation generator capable of covering a wide frequency range, in fixed frequency steps, with accuracy determined by a single frequency source, such as a crystal-controlled oscillator, that constitutes its internal standard of frequency. Any frequency within its range can be set up directly by means, for example, of a series of decade switches calibrated directly in frequency.

Referring now firstly to FIGURE 1, the oscillation generator comprises a crystal-controlled master oscillator 1 serving as a frequency standard and operating at a frequency $F_S$, and a digital frequency divider 2 operated at a fixed division factor K to produce on its output line 3, a train of pulses at a repetition frequency $F_S/K$. The useful output of the generator is obtained from a slave oscillator 4 tunable over the required frequency range. In order to control the frequency of the slave oscillator 4 to a selected integer multiple of the base frequency $F_S/K$, the output of the slave oscillator 4, in addition to being applied to an output line 5, is also supplied to a second frequency divider 6, which likewise operates on the digital principle, but the division factor N of which, in contrast to that of divider 2, is adjustable to any one of the digital numbers corresponding to the multiples of the base frequency at which slave oscillator 5 is required to be operable. Both dividers 2 and 6 are arranged to supply a pulse output, and both the output of fixed-ratio divider 2, via its output line 3, and the output of variable-ratio frequency divider 6, via line 7, are supplied as inputs to a frequency comparator and controller 8 which, via line 9 varies the tuning of the slave oscillator 4 to increase or decrease its oscillation frequency when the number of pulses received from line 3 exceeds the number of pulses received from line 7 or vice versa. When the frequency of pulses produced by the slave oscillator is close to the desired frequency, comparatively long periods will arise in which no excess pulse is received from either line 3 or line 7, and accordingly a phase-responsive fine control is arranged to be provided in these circumstances by means of a phase comparator 10 which produces an output proportional to phase differences between the pulses received respectively from lines 3 and 7, the phase-comparator output being utilised for a fine control of the slave-oscillator frequency, firmly locking that frequency to the selected multiple of the base frequency produced from the frequency standard.

In FIGURES 2–5, there are shown block diagrams of various embodiments of the variable divider 6 of FIG. 1. The variable divider circuit shown in FIG. 2 comprises two counting stages 11 and 12 connected in cascade configurations, both counters being resettable respectively to a value controllable by inputs on leads 11*a* and 12*a*. Input pulses are applied along lead 13 passed through AND gate 14 and enter the input 11*b* of counter stage 11. When sufficient pulses have entered counter stage 11 to count up to its radix value a carry pulse is passed along lead 15 to counter stage 12.

The counter 11 is reset, according to the settings on control leads 11*a* only when an input pulse is applied to the reset input 11*c* thereof. Input pulses to reset input 11*c* are normally blocked by AND gate 16 which is normally closed, AND gate 14 being normally open, to allow input pulses to pass the input 11*b* of counter stage 11, by virtue of the fact that the signal on lead 17 is inverted by an inverter 18.

When sufficient carry pulses have passed from counting stage 11 along lead 15 to cause counting stage 12 to reach its recognition state an output is provided at recognition output 12*b* of counting stage 12 which output passes through a switch SW1 to input 19*b* of a bistable device 19 to change its state. The output from bistable device 19 passes to an AND gate 20 which is normally closed. When on its next count, counting stage 11 reaches its recognition state an output is provided on recognition output 11*d* which passes to AND gate 20 which now opens. The output from AND gate 20 is now passed along lead 17 inverted by inverter 18 and applied to AND gate 14 to close it. The next input pulse at lead 13 passes to AND gate 16 which is now opened by the output from AND gate 20 and the output from AND gate 16 causes the counting stage 11 to be reset due to the application of an input pulse to reset input 11*c*, the input to input 19*a* of bistable device 19 causing it to change back to its initial state. An output pulse from the arrangement shown, may be taken from the reset line from AND gate 16, and this may be used as the overall output from the divider, or may provide the input to further similar output stages.

Counting stage 12 can be reset in a similar manner to that utilised for counting stage 11, alternatively it can be reset by re-routing a carry pulse, or by taking the output from bistable device 19 when it changes back to its initial state.

The division ratio of the variable frequency divider, which is controlled by leads 11*a* and 12*a*, can be varied by a predetermined amount by throwing the switch SW1 into its other position from that shown. This now includes a further counting stage 21 in the path between the recognition output 12*b* of counting stage 12 and bistable device 19; the division ratio of counter 21 may be variable, to account for the different intermediate frequencies, or it may be preset to account for a single intermediate frequency. The recognition state of the whole arrangement can now be delayed according to the number of inputs required at counting stage 21 to produce an output to change the state of bistable device 19. Hence the division ratio of the whole arrangement can be varied by the setting of this single counting stage 21. It will be seen then that the variable divider may be set up by means of leads 11*a* and 12*a*, to indicate a certain division ratio, but the actual division ratio of the divider may be arranged to depend on the setting of counting stage 21.

Figure 2:
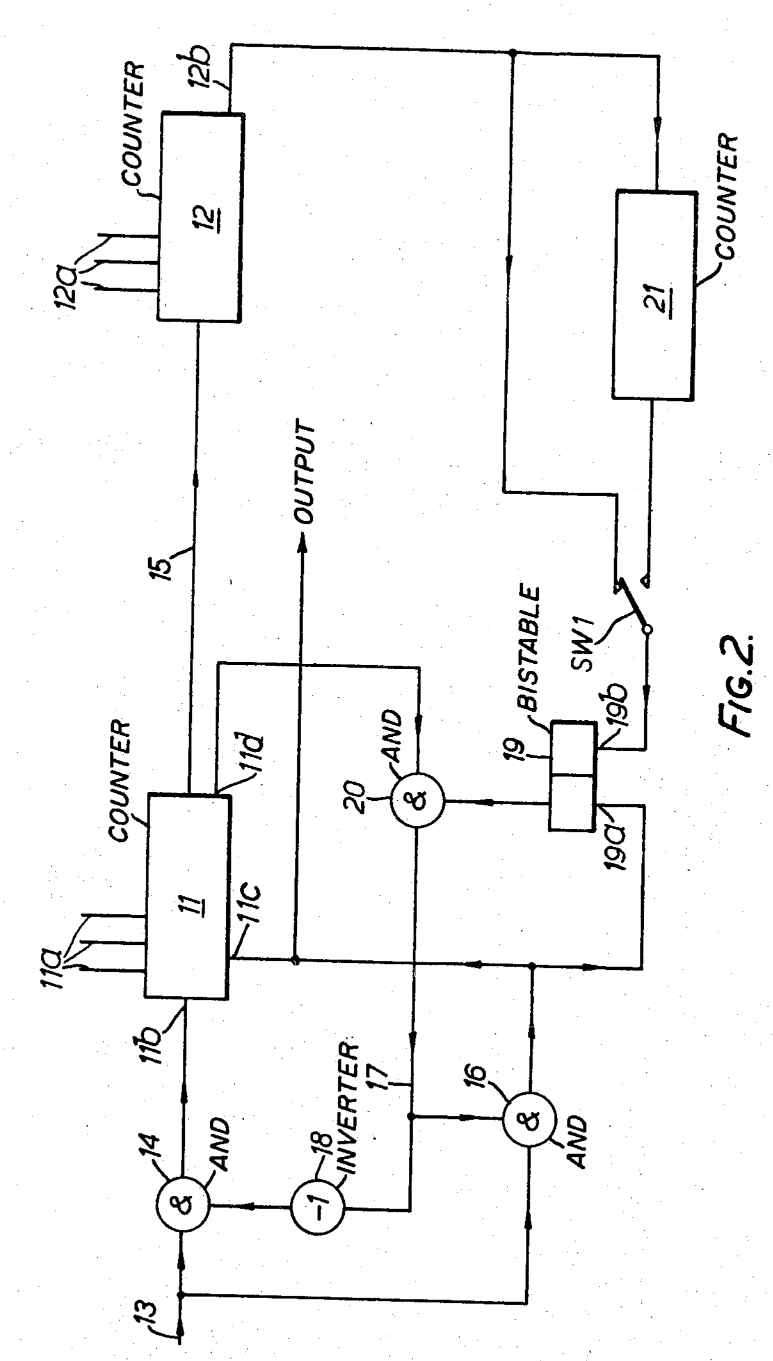
FIGURE 2 shows the variable frequency divider of FIGURE 1 in greater detail.
Figure 3:
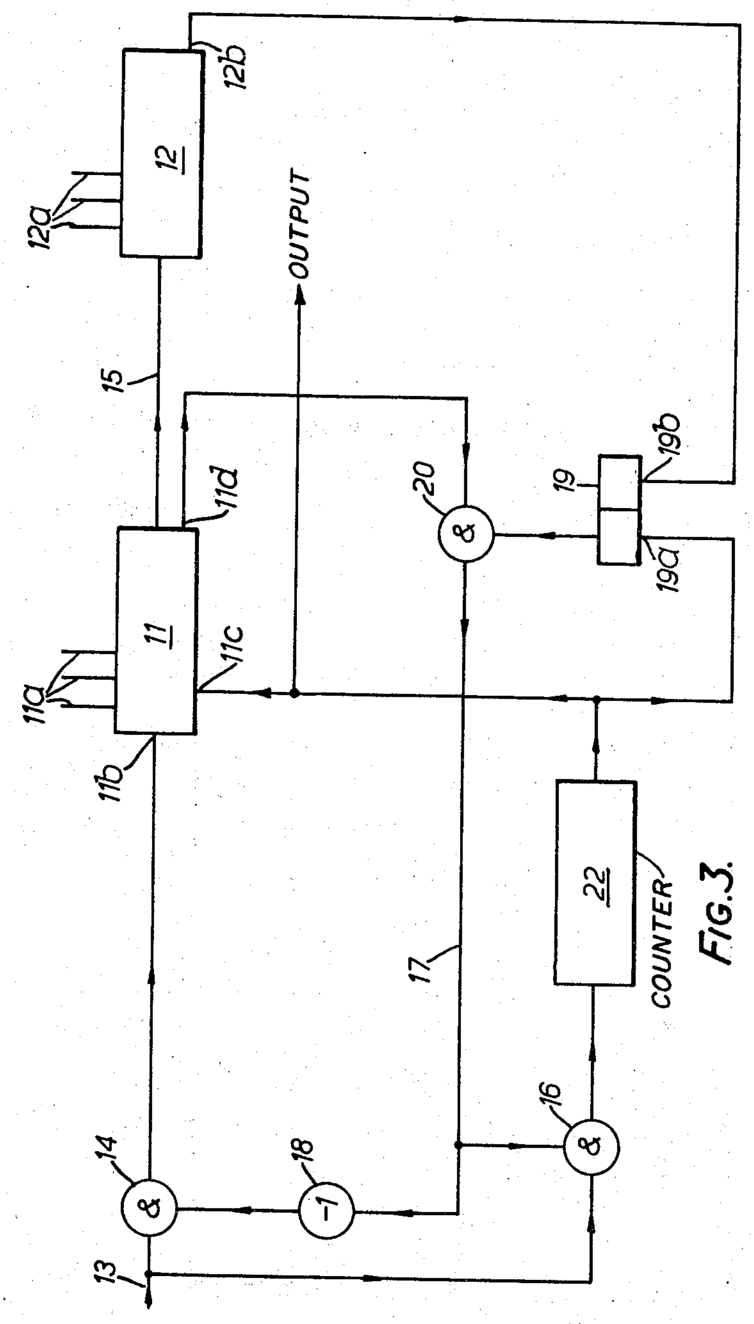
FIGURE 3 shows an alternative circuit arrangement to that of FIGURE 2.

Referring now to FIGURE 3 there is shown a similar arrangement to that of FIGURE 2 except that in this instance the division ratio setting of the arrangement is varied by delaying the reset of the counter stage 11. This is achieved by including a counting stage 22, similar to stage 21 of FIG. 2, between the output of AND gate 16, and, on the other hand, reset input 11*c* of counting stage 11, and on the other hand, the input to bistable device

19. With this arrangement, considering the counting radix of counting stage 22 to be X, the reset pulse to counting stage 11 and bistable device 19 is delayed by $X-1$ input pulses. In this case an output may be taken from counting stage 22.

Figure 4:
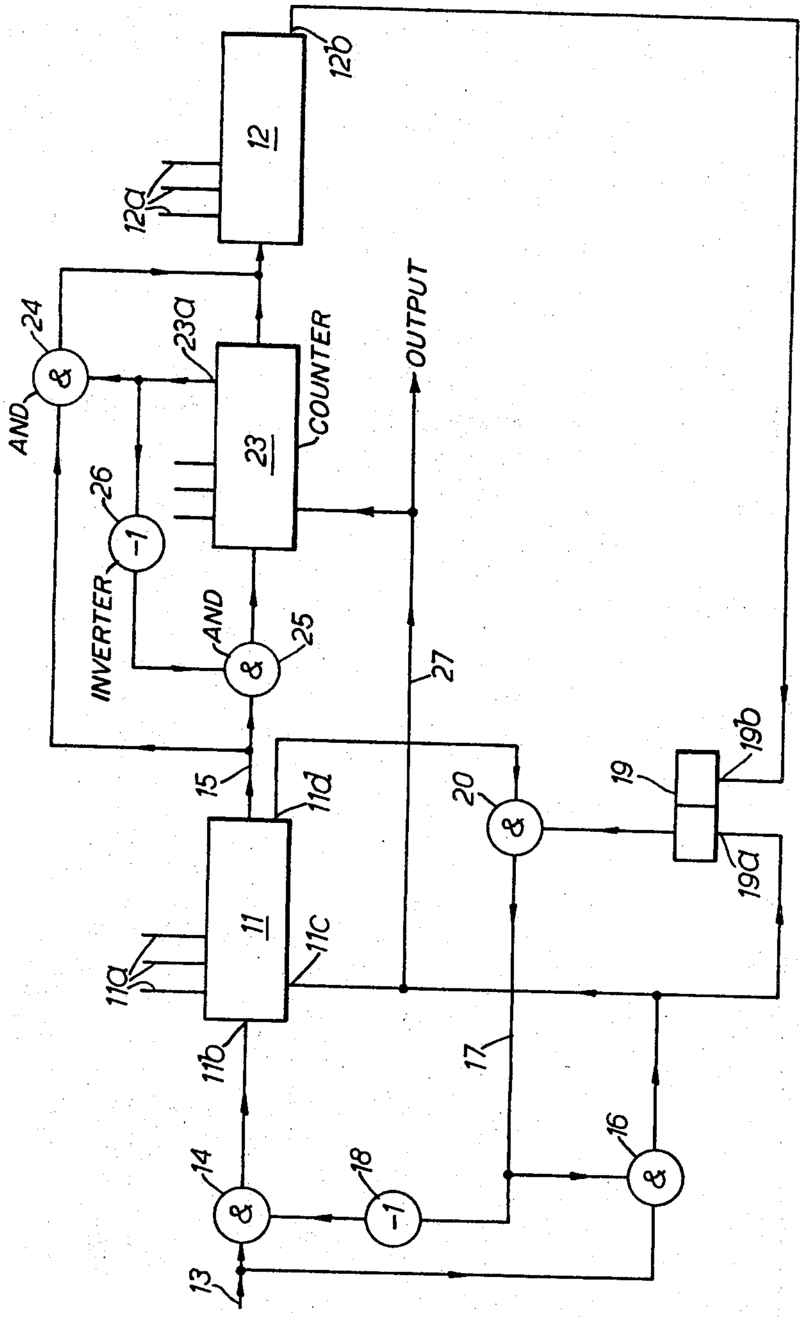
FIGURE 4 shows a still further alternative to the circuit arrangement of FIGURE 2.

Referring now to FIGURE 4 there is shown a similar arrangement to that of FIGURE 2 except that the division ratio set into the frequency divider is varied by inhibiting a predetermined number of carry pulses from counting stage 11 to counting stage 12. This is achieved by inserting a further counting stage 23, similar to counting stages 11 and 12 in the lead 15 between the counter stages 11 and 12. The counting stage 23 is arranged to be initially in its reset condition. Hence the output at recognition output 23*a* of counting stage 23 is zero so causing an AND gate 24, which by-passes the counting stage 23, to be closed and an AND gate 25 to be open due to the inversion of the output from recognition output 23 by an inverter 26.

Carry pulses from counting stage 11 are blocked from passing through AND gate 24 but pass through AND gate 25 into counting stage 23. This state of affairs obtains until the recognition state of counting stage 23 is reached. At this point the output from recognition outputs 23*a* opens AND gate 24 and is inverted by inverter 26 to close AND gate 25. Hence, following carry pulses from counting stage 11 by-pass counting stage 23 via AND gate 24 and pass directly into counting stage 12.

This state of affairs now obtains until counting stage 11 is reset, by the output from the AND gate 16, counting stage 23 being reset via lead 27. An output is taken from AND gate 16 as in FIG. 2.

Figure 5:
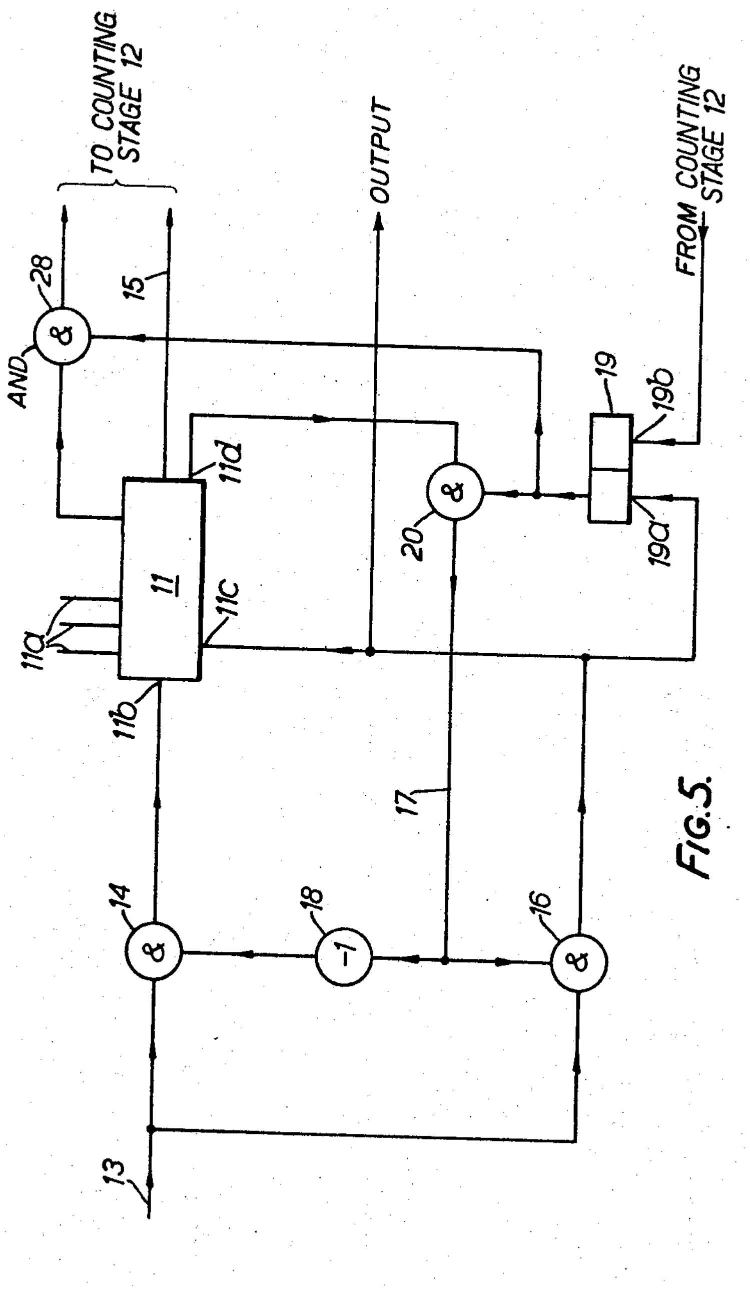
FIGURE 5 shows yet another alternative for the circuit arrangement of FIGURE 2.

Referring now to FIGURE 5 there is shown an arrangement similar to that of circuit 2, counting stage 11 only being shown, except that the division ratio of the frequency divider is varied from that set by the leads 11*a* and 12*a* by an arrangement which adds extra carry pulses between counting stage 11 and counting stage 12.

This is achieved by inserting an AND gate 28 which derives one of its inputs from a predetermined counting state of the counting stage 11 and the other of its inputs from the output of bistable device 19. The output of AND gate 28 is applied to the input of counting stage 12. Hence additional carry pulses are passed to counting stage 12 only when there is a coincidence of the bistable device being in its state other than its said initial state and the counting stage 11 being at said predetermined state.

What we claim is:

1. A variable divider comprising first counter means operative to be set to a preselected division ratio, said counter means including first input terminal means, and second and third input terminal means for the application thereto of reset pulses, and output terminal means; said counter means being operative, in response to the application to its said first input terminal means of a train of incoming signal pulses, to produce an output pulse at its said output terminal means when said counter means attains its recognition state; a bistable device operable when said counter means attains its recognition state and having first and second input terminals and an output terminal; gating means having first input terminal means for the application thereto of a train of input signal pulses, second input terminal means connected to the said bistable device output terminal, and output terminal means, said gating means output terminal means being connected to said counter means first input terminal means for selective applying said train of input signal pulses to said counter means first input terminal means, connected to said bistable device second input terminal for the return of said bistable device to its initial stage, and connected to said counter means second input terminal means for the selective application thereto of reset pulses, to thereby reset said counter means; said counter means output terminal being connected to said bistable device first input terminal; said variable divider having an output terminal at said counter means second input terminal means, said counter means third input terminal means being operative upon the application thereto of reset pulses, to preset the division ratio of said variable divider constituting the ratio of said train of input pulses at said gating means input terminal to said reset pulses applied to said counter means second input terminal means, and side-step means connected to said counter means and said bistable device and operative to selectively vary the input of reset pulses to said counting means at said counting means second input terminal, to thereby vary said variable divider division ratio.

2. A variable divider as defined in claim 1, wherein said side-step means including means operative to cause the division ratio of said variable divider to be greater than the division ratio set into said counter means.

3. A variable divider as defined in claim 1, wherein said side-step means including means operative to cause the division ratio of said variable divider to be less than the division ratio set into said counter means.

4. A variable divider as defined in claim 2, wherein said side-step means comprises further counter means having output means and input means connected to said counter means output terminal means, said further counter means being settable to a division ratio corresponding to a desired side-step, and switching means operative to interconnect said bistable device first input terminal and said counter means output means in one switch position, and to interconnect said bistable device first input terminal and said further counter means output means in the other switch position, to thereby selectively delay the operation of said bistable device.

5. A variable divider as defined in claim 2, wherein said side-step means comprises further counter means settable to a division ratio corresponding to a desired side-step, said further counter means having input means connected to said gating means output means and output means connected to said bistable device second input terminal and to said counter means second input terminal means, said counter means output terminal means being connected to said bistable device first input terminal, whereby the pulses of said input pulse train diverted by said gating means from said counter means first input terminal means are applied to said further counter means, to thereby delay the resetting of said counter means.

6. A variable divider as defined in claim 2, wherein said counter means comprises first and second counters, said first counter having an output terminal and said second counter having input and output terminals; and wherein said side-step means comprises further counter means settable to a division ratio corresponding to a desired side-step and having input, output, and reset input terminals; and further gating means, said further counting means having first and second input terminals and first and second output terminals, said further gating means first input terminal being connected to said first counter output terminal, said further gating means first output terminal being connected to said further counter first input terminal, said further counter first output terminal being connected to said second counter input terminal, said further counter's second output terminal being connected to said further gating means second input terminal, said further gating means second output terminal being connected to said second counter input terminal, said counter means second input terminal being connected to said further counter reset input terminal, said further gating means thereby causing pulses of said input pulse train applied to said gating means input terminal means to bypass said further counter means, when said further counter means has reached its recognition state, thereby selectively varying the division ratio of said variable divider.

7. A variable divider as defined in claim 3, wherein said side-step means comprises further gating means having first and second input terminals and an output terminal, said counter means comprising first and second counters, said first counter having first, second, and third output terminals, and said second counter having first and second input terminals, said first counter second output terminal being connected to said second counter first input terminal, and said first counter first output terminal being connected to said further gating means first input terminal, said further gating means output terminal being connected to said second counter second input terminal, said bistable device output terminal being connected to said further gating means second input terminal, whereby an additional pulse is introduced between said first counter to said second counter to thereby vary the division ratio of said variable frequency divider.

References Cited

UNITED STATES PATENTS

| | | | |
|---|---|---|---|
| 2,854,579 | 9/1958 | De Frijer | 331—18 |
| 3,130,376 | 4/1964 | Ross | 331—18 |
| 3,165,706 | 1/1965 | Sarratt | 331—18 |
| 3,259,851 | 7/1966 | Brauer | 331—18 |

JOHN S. HEYMAN, *Primary Examiner.*

ROY LAKE, *Examiner.*

S. GRIMM, *Assistant Examiner.*